United States Patent [19]

Smith et al.

[11] Patent Number: 4,848,824
[45] Date of Patent: Jul. 18, 1989

[54] TRUCK BED RIM FRAME WITH EXPRESS ACCESS FLAP

[76] Inventors: Gerald N. Smith, 914 Scio St., Elmira, N.Y. 14901; Ronald E. Varnum, 1140 Grand Central Ave., Horseheads, N.Y. 14845

[21] Appl. No.: 157,539

[22] Filed: Feb. 19, 1988

[51] Int. Cl.$^4$ .................................................. B60J 7/10
[52] U.S. Cl. .................................... 296/100; 296/24.1; 296/37.6
[58] Field of Search ................... 296/100, 37.6, 24 R; 410/104, 129, 96

[56] References Cited

U.S. PATENT DOCUMENTS

| | | | |
|---|---|---|---|
| 3,936,077 | 2/1976 | Bliek | 296/100 |
| 4,496,184 | 1/1985 | Byrd et al. | 296/100 |
| 4,507,033 | 3/1985 | Boyd | 410/104 |
| 4,639,033 | 1/1987 | Wheatley et al. | 296/100 |
| 4,647,103 | 3/1987 | Walblay | 296/100 |
| 4,730,866 | 3/1988 | Nett | 296/100 |

Primary Examiner—Robert R. Song
Attorney, Agent, or Firm—Ralph R. Barnard

[57] ABSTRACT

A truck bed rim frame having a removable and/or movable express access flap to be mounted over the rim of a truck bed for the dual purposes of supporting a cover and creating a storage compartment in the rear portion of the truck bed under the cover. The end of the truck bed rim frame resting over the tailgate is removable to allow full use of the truck bed when the cover is not in use. A cover physically matching the periphery of the frame is disposed over the frame in a detachable manner. A removable express access flap suspends vertically from the sides of the frame and abuts against the wheel wells to form a convenient storage compartment in the rear portion of the truck bed.

3 Claims, 2 Drawing Sheets

TRUCK BED RIM FRAME WITH EXPRESS ACCESS FLAP

BACKGROUND OF THE INVENTION

The present invention is related to truck bed covers for enclosing the cargo area of a vehicle, and more particularly to a truck bed rim frame having a removable express access flap to be mounted over the rim of a truck bed for the dual purposes of supporting a cover and creating a storage compartment in the rear portion of the truck bed under the cover.

There are many types of vehicles, such as pickup trucks, which include a rear cargo bed which is open at its top. These cargo beds consist of generally parallel side walls which, together with the tailgate, form a truck bed.

It is often desirable to cover the truck bed and its contents for protection from the elements and for security purposes. A cover is also known to reduce tailgate drag. Moreover, the cover may enhance the appearance of the vehicle overall.

The prior art teaches many kinds of truck bed covers. They include both soft flexible covers and hard truck caps. The flexible covers may or may not be mounted on a truck bed rim frame. Frequently utilized is a flexible tonneau cover that snaps directly, by means of snap caps arranged around its periphery, onto snap studs which are individually drilled into the truck bed walls. One disadvantage of this method of covering the truck bed is that numerous drillings into the truck bed walls are required, making these areas more vulnerable to rust and to damage generally.

Another method of covering the truck bed is to first attach a frame to the truck bed rim using a minimal number of screws. The cover is then attached to the frame. One disadvantage of the additional frame is that the part of the frame that rests above the tailgate bars full use of the truck bed when the cover is not being used.

Yet another method of covering the truck bed is by means of a more permanent, hard truck cap.

There is a common problem with all of the above described truck bed covers, particularly with covers that do not elevate above the rim of the truck bed walls. Access to whatever is stored in the truck bed is made via the tailgate and access to some of the storage area is remote. If the contents of the truck bed slide forward during transit, they become difficult to reach without crawling on one's belly between the floor of the truck bed and the cover. The only other option to removing the stored items is to remove the cover, which is both time consuming and inconvenient. Therefore, a unique problem is created when a cover is used, particularly one that is not elevated above the rim of the truck bed walls. This problem does not arise when a cover is not used. While stored items may slide around in an uncovered truck bed, they are still easily accessible by reaching over the truck bed walls from the nearest point outside of the truck.

SUMMARY OF THE INVENTION

The present invention provides an improved truck bed rim frame which overcomes all of the above mentioned disadvantages of the previously known devices. Additionally, it provides an express access flap which suspends vertically from the frame to create a convenient storage space at the rear portion of the truck bed.

It is an object of the present invention to provide a truck bed rim frame for a vehicle having a cargo bed and a tailgate. In brief, a rigid frame is attached to the truck bed rim by conventional means, minimizing the drilling into the truck bed walls. A flexible tonneau cover or a truck cap is attached to the frame by snaps or other means.

It is another object of the invention to provide a truck bed rim frame that is easily detachable at the tailgate for the purpose of eliminating interference with the full use of the truck bed and tailgate when the cover is not in use.

It is yet another object of the invention to create a convenient storage area at the back of the truck bed for express access through the tailgate

DESCRIPTION OF THE PREFERRED EMBODIMENT

Figure 1:
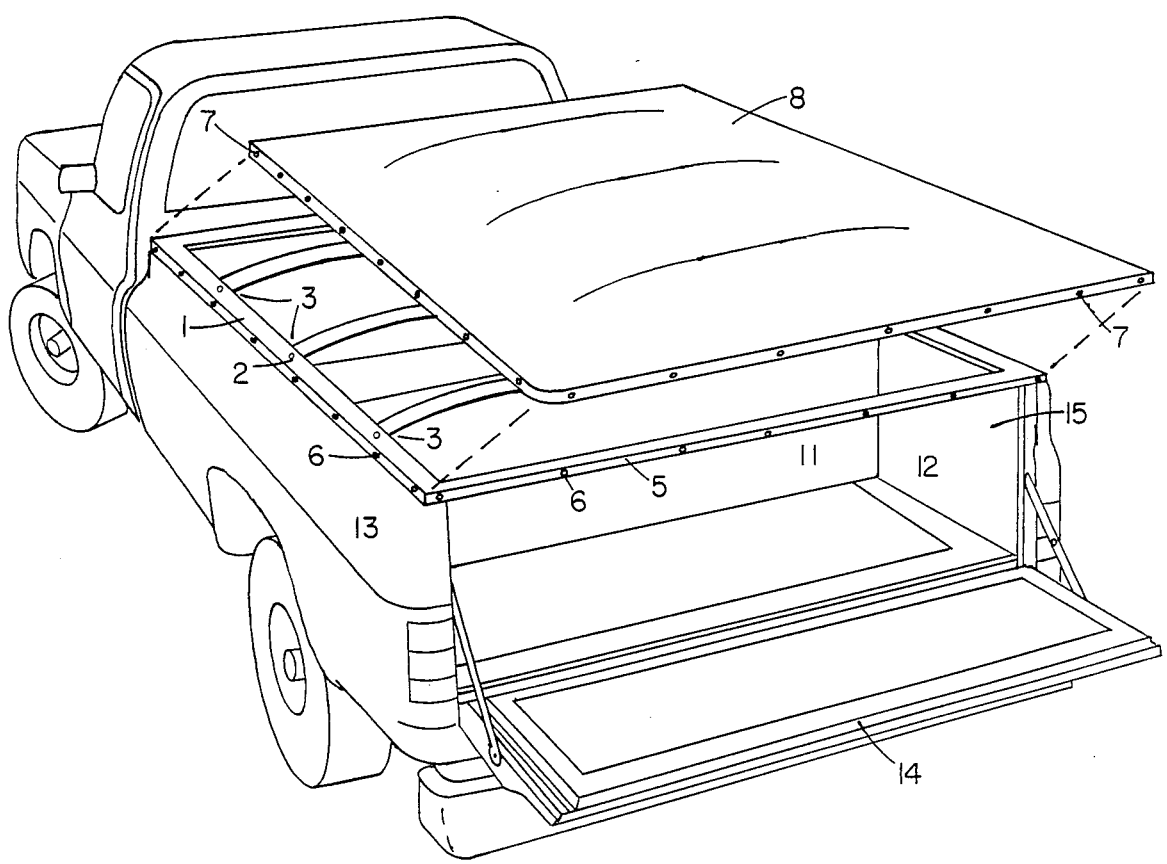
FIG. 1 is a perspective view of the truck bed rim frame, a flexible tonneau cover, and the express access flap and its relationship with the truck bed and the tailgate.
Figure 2:
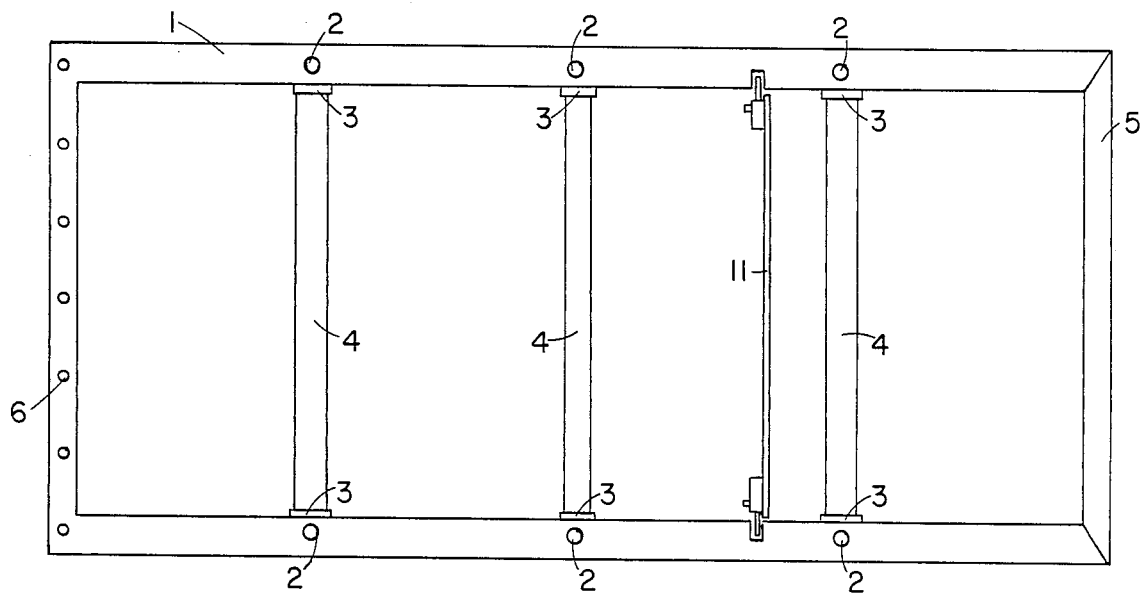
FIG. 2 is a top view of the truck bed rim frame and the express access flap.

Referring now to FIGS. 1 and 2, a truck bed rim frame (1), made of a rigid and durable material, such as aluminum, is attached to the rim of the truck bed walls (12) by conventional means. Three, #12 one and a half inch screws (2), on each truck bed wall has been found sufficient in practice to securely hold the frame onto the truck. A hard truck cap or a flexible tonneau cover may then be attached to the frame. The present invention as used in practice employs a flexible tonneau cover and is described with such a cover below. However, the above and below mentioned descriptions of the cover are not intended as limiting the scope of the invention, but rather are used by way of illustration only.

When a flexible tonneau cover is used, snap studs (6) are embedded on the outer periphery of the frame. The truck bed rim frame provides an advantage over the traditional means of securing a tonneau cover. It eliminates about ninety percent of the drillings that would otherwise be required to embed the snap caps directly into the walls of the truck bed. Also, the use of closed cell foam tape on the bottom of the frame (1) may be used to protect the truck from scratches. The tape is also water repellent, further protecting the truck bed (13). An advantage of the present invention is that a removable end (5) of the frame (1) allows the truck bed (13) and tailgate (14) to be used fully without interference or obstacle. The removable end is a sliding metal insert which holds itself within the hollow truck bed rim frame (1) by tension. This method of insertion is preferable over other methods of attaching the removable end, such as by means of pins or screws. Pins tend to get lost and are difficult to use, and screws require the use of tools.

Bow sockets (3) are built into the frame (1) on both sides of its long dimension. Generally two to four sockets will be necessary on each side of the frame depending on the length of the truck bed. As the truck bed increases in length, it is necessary to increase the number of bows (4) in order to provide a sufficient support structure for the tonneau cover (8).

A tonneau cover (8) made of flexible material, such as heavy duty vinyl, is embedded with snap caps (7) spaced around its periphery. The snap caps correspond with and snap onto the snap studs (6) of the truck bed frame (1). To ensure the lift of the tonneau cover (8), it is a good idea to double reinforce the cover (8) at each snap cap (7), to prevent ripping.

Figure 3:
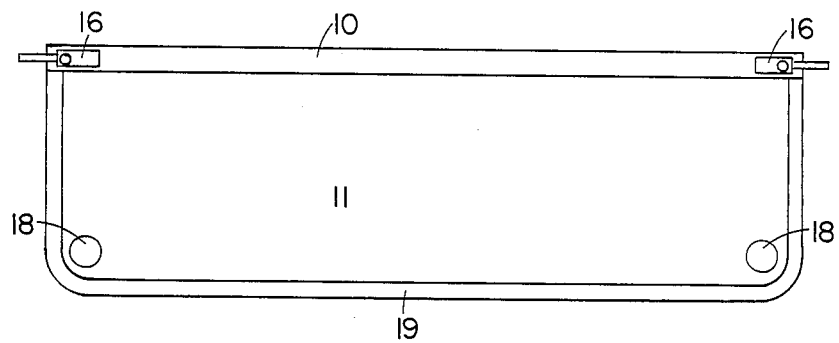
FIG. 3 is a front view of the express access flap.

FIG. 3 shows a detailed illustration of one of the primary benefits of the present invention, also shown in combination with a truck bed, truck bed rim frame, and a cover in FIG. 1. It is the express access flap (11), made of a rigid panel of material such as wood or metal, which creates a convenient storage compartment (15) in the rear of the truck bed. Such a compartment may be used to keep luggage, groceries, tools, etc. from sliding to the front portion of the truck bed where they are difficult to reach via the tailgate. The express access flap (11) may be attached to the truck bed frame by any means. One method is to provide an insert hole (9) on either side of the frame (1) for insertion of a spring loaded or sliding latch (16) connected to the flap (11). The flap is suspended vertically by the cooperation of the latch (16) and insert holes (9) in the frame (1). A metal edge reinforcement (10) may be fixed on the top of the flap (11) to support the latches (16). The flap is placed such that is is stabilized by abutment against the wheel wells (17) of the truck bed (13). A bumper (18) made of a flexible material, such as rubber, may be attached to the flap (11) so that the flap does not scratch the wheel wells (17) upon contact. The flap's edge may be covered by a protective material (19), which adds protection to both the cargo and the flap itself.

The express access flap (11) should be made with rounded edges to allow sufficient clearance in the bottom of the truck bed. The bottom of flap (11) may be pulled out toward the tailgate and attached by any conventional means to the frame (1) when not in use.

Accordingly, it is to be understood that the embodiment of the invention herein described is merely illustrative of the application of the principles of the invention. Reference herein to details of the illustrated embodiment are not intended to limit the scope of the claims, which themselves recite those features regarded as essential to the invention.

We claim:

1. Apparatus for covering and compartmentalizing a truck bed having a tailgate, comprising;
   (a) a rigid truck bed rim frame to be mounted over a truck bed opening;
   (b) said truck bed rim frame being fastened by conventional means to the top perimeter of said truck bed opening;
   (c) a cover, physically matching the periphery of and disposed over said frame;
   (d) means, attached to said flexible covering, for securely fastening said flexible covering to said truck bed rim frame;
   (e) means, suspended from said truck bed rim frame, parallel to said tailgate for compartmentalizing the truck bed for express access to the area adjacent to the tailgate;
   (f) means for detaching said truck bed frame at the rear of said the truck bed opening;
   (g) said compartmentalizing means being removably connected by latch means to the sides of said truck bed frame, toward the rear portion of the truck bed opening, which may be vertically suspended in the truck bed opening to create a storage compartment in the rear portion of said truck bed opening against a stop in the floor of the truck bed.

2. The apparatus of claim 1, further comprising:
   (a) bow socket means, equally spaced on the long dimension of said truck bed frame, for receiving flexible bows across the truck bed opening;
   (b) flexible bows, attached to said bow socket means, mounted across said truck bed opening;

3. The apparatus of claim 2, wherein said fastening means comprises snap studs embedded in said truck bed frame and corresponding snap caps embedded on the periphery of said flexible covering to be snapped onto said snap studs.

* * * * *